(12) United States Patent
Matsuyama

(10) Patent No.: US 6,806,684 B2
(45) Date of Patent: Oct. 19, 2004

(54) BATTERY PACK

(75) Inventor: Hirotsugu Matsuyama, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 17 days.

(21) Appl. No.: 10/351,925

(22) Filed: Jan. 28, 2003

(65) Prior Publication Data

US 2003/0141846 A1 Jul. 31, 2003

(30) Foreign Application Priority Data

Jan. 28, 2002 (JP) ..................................... 2002-017862

(51) Int. Cl.⁷ .............................................. H02J 7/00
(52) U.S. Cl. ..................................................... 320/112
(58) Field of Search ............................... 320/101, 112, 320/145, 162, 138; 323/906; 307/18, 19, 20, 21, 22, 46, 48, 64, 66, 85, 86, 150, 151, 152

(56) References Cited

U.S. PATENT DOCUMENTS

| | | | |
|---|---|---|---|
| 4,232,523 A | * 11/1980 | Derby et al. ............. | 60/641.15 |
| 4,281,278 A | * 7/1981 | Bilsky et al. ............... | 320/101 |
| 4,375,662 A | * 3/1983 | Baker ......................... | 323/906 |
| 4,494,063 A | * 1/1985 | Callen et al. ................ | 320/101 |
| 5,025,202 A | * 6/1991 | Ishii et al. .................... | 320/101 |
| 5,057,383 A | * 10/1991 | Sokira .......................... | 429/92 |
| 5,929,538 A | * 7/1999 | O'Sullivan et al. ............ | 307/64 |
| 5,969,512 A | * 10/1999 | Matsuyama ................. | 307/130 |
| 6,191,505 B1 | * 2/2001 | Matsuyama ................. | 307/130 |
| 6,384,570 B2 | * 5/2002 | Matsuyama ................. | 320/101 |
| 6,529,389 B2 | * 3/2003 | Perlick et al. ................ | 363/20 |

FOREIGN PATENT DOCUMENTS

JP    A 2001-178017    6/2001

* cited by examiner

*Primary Examiner*—Pia Tibbits
(74) *Attorney, Agent, or Firm*—Young & Thompson

(57) ABSTRACT

A chargeable battery or a battery pack stores electrical energy, and supplies the electrical energy to a portable terminal device connected to the battery pack. A display device of the battery pack derives a value of a current flowing through a sensor which is connected to the chargeable battery. The display device derives the remaining amount of electrical energy stored in the chargeable battery, by adding up the derived current value. The display device includes a plurality of photodiodes, and shows the remaining amount of electrical energy stored in the chargeable battery, by lighting up corresponding number of photodiodes corresponding to the derived remaining amount.

11 Claims, 11 Drawing Sheets

BATTERY PACK

BACKGROUND OF THE INVENTION

1. Field of the Invention

The present invention relates to a battery pack.

2. Description of the Related Art

Portable terminal devices such as cellular phones, PDAs (Personal Digital Assistants), notebook type computers, etc. use chargeable batteries such as lithium ion batteries as power source. A chargeable battery is charted by being connected to commercial power source.

However, one can not always use commercial power source when he/she is outdoors. In this case, the chargeable battery might run down while one uses his/her portable terminal device. Therefore, one can not use his/her portable terminal device for a long time outdoors.

Unexamined Japanese Patent Application KOKAI Publication No. 2001-178017 discloses a battery pack comprising a solar panel which converts optical energy into electrical energy. In a case where commercial power source can not be used, a chargeable battery in the battery pack is charged by the solar panel.

However, the charging speed by the solar panel varies in accordance with the weather. Further, the remaining amount of electrical energy that can be supplied by the chargeable battery can not be known from the appearance.

To know the remaining amount of the chargeable battery, a device for measuring the remaking amount of the chargeable battery must be used. In other words, a user of a portable terminal device can not know the remaining amount of a chargeable battery unless he/she carries a measuring device.

Generally, users do not carry a measuring device. Therefore, those users might use their portable terminal devices although there is little energy left in the chargeable battery, and have the chargeable battery run down while they are using the device.

The content of U.S. Pat. No. 6,384,570, which corresponds to Unexamined Japanese Patent Application KOKAI Publication No. 2001-178017, is incorporated herein by reference.

SUMMARY OF THE INVENTION

Accordingly, an object of the present invention is to provide a battery pack which shows the remaining amount of electrical energy that can be supplied.

To achieve the above object, a battery pack according to the present invention comprises:

a battery which stores electrical energy;

a remaining amount deriving unit which derives a remaining amount of the electrical energy stored in the battery; and a first showing unit which shows the remaining amount derived by the remaining amount deriving unit.

The remaining amount deriving unit may include: a resistor circuit which is connected to the battery; and an adding-up unit which derives the remaining amount of the electrical energy stored in the battery by adding up a value of a current flowing through the resistor circuit.

The first showing unit may include a plurality of light emitting elements, and light up corresponding number of the light emitting elements corresponding to the remaining amount derived by the adding-up unit.

The battery pack may be connectable to an external power source, and the battery may be a chargeable battery, and may be charged with electrical energy supplied from the external power source.

The battery pack may further comprise a solar panel which converts optical energy into electrical energy, and the battery may be a chargeable battery, and may be charged with electrical energy obtained by conversion by the solar panel.

The battery pack may be connectable to an external power source, and in a case where the battery pack is connected to the external power source, the battery may be charged with electrical energy supplied from one of the solar panel and the external power source.

The battery pack may further comprise: a level deriving unit which derives a level of electrical energy supplied from the solar panel; and a second showing unit which shows the level derived by the level deriving unit.

The second showing unit may include a plurality of light emitting elements, and light up corresponding number of the light emitting elements corresponding to the level derived by the level deriving unit.

The battery pack may be connectable to an external device, and when connected to the external device, may supply electrical energy from one of the battery, the solar panel, and the external power source to the external device, and in a case where electrical energy is supplied from one of the solar panel and the external power source to the external device, the battery may be charged with electrical energy from the one of the solar panel and the external power source.

The battery pack may further comprise: a specifying unit which specifies which of the battery, the solar panel, and the external power source is a supply source of electrical energy which is supplied to the external device; and a third showing unit which shows the supply source specified by the specifying unit.

The specifying unit may determine whether the battery is charged or not, and in a case where determining that the battery is not charged, may specify the battery as the supply source.

The battery pack may further comprise: a first level deriving unit which derives a level of electrical energy supplied from the solar panel; and a second level deriving unit which derives a level of electrical energy supplied from the external power source, and the specifying unit may determine which of the level derived by the first level deriving unit and the level derived by the second level deriving unit is higher than the other in a case where it determines that the battery is charged, may specify the solar panel as the supply source in a case where it determines that the level derived by the first level deriving unit is higher, and may specify the external power source as the supply source in a case where it determines that the level derived by the second level deriving unit is higher.

The third showing unit may include a first light emitting element which indicates that the supply source is the battery, a second light emitting element which indicates that the supply source is the solar panel, and a third light emitting element which indicates that the supply source is the external power source, and the specifying unit may light up the first light emitting element in a case where it specifies the battery as the supply source, may light up the second light emitting element in a case where it specifies the solar panel as the supply source, and may light up the third light emitting element in a case where it specifies the external power source as the supply source.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

First Embodiment

A battery pack according to a first embodiment of the present invention will now be explained with reference to the drawings.

Figure 1:
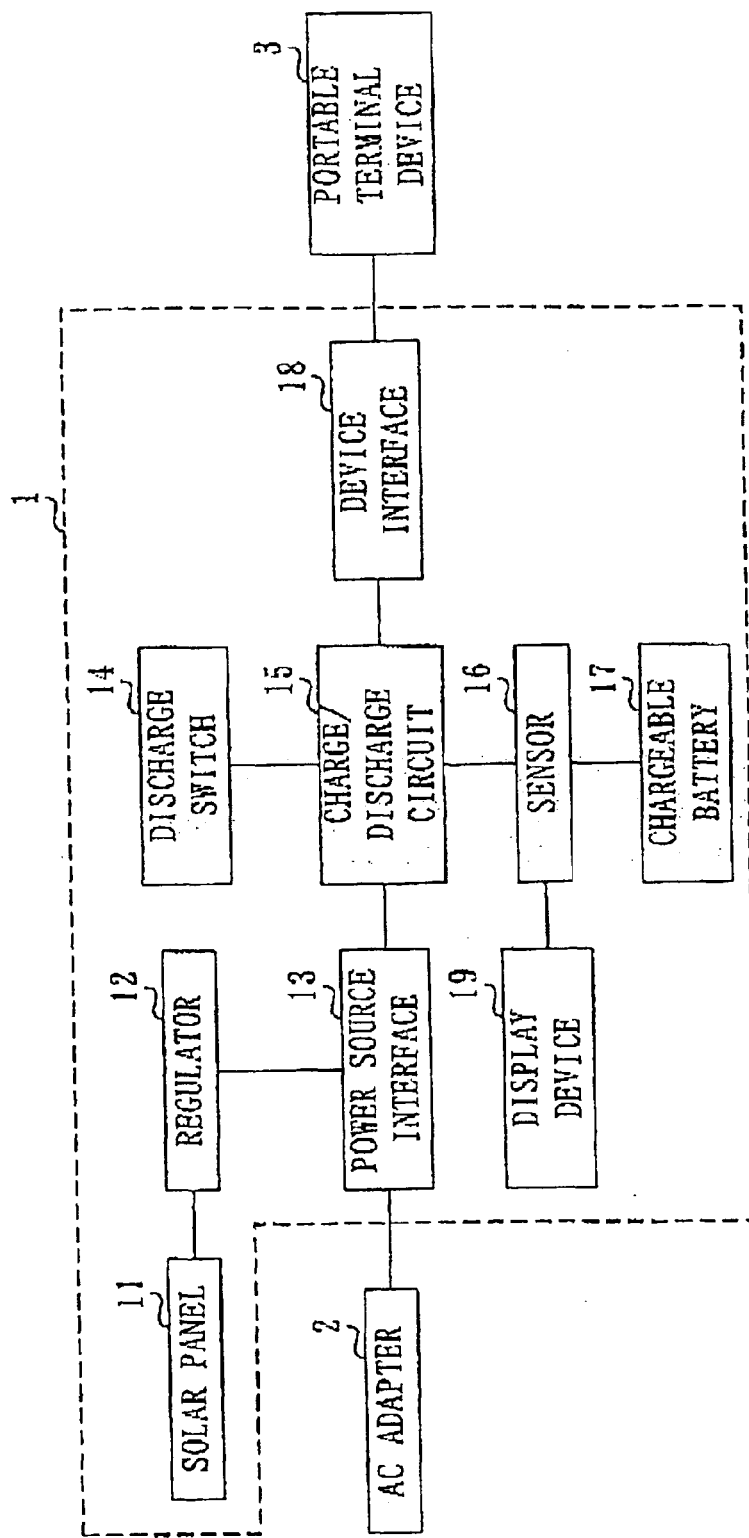
FIG. 1 is a diagram showing a structure of a battery pack according to a first embodiment.

FIG. 1 is a diagram showing a structural of a battery pack 1 according to the first embodiment.

The battery pack 1 is connected to a non-illustrated external power source via an AC adapter 2, and stores electrical energy supplied from the external power source. The battery pack 1 also converts optical energy into electrical energy and stores it. The battery pack 1 supplies the stored electrical energy to a portable terminal device 3 such as a cellular phone, a PDA (Personal Digital Assistant), a notebook type computer, etc.

As shown in FIG. 1, the battery pack 1 comprises a solar panel 11, a regulator 12, a power source interface 13, a discharge switch 14, a charge/discharge circuit 15, a sensor 16, a chargeable battery 17, a device interface 18, and a display device 19.

The solar panel is constituted by a solar cell or the like, and converts optical energy into electrical energy. The solar panel 11 is connected to the power source interface 13 via the regulator 12. The solar panel 11 supplies the converted electrical energy to the power source interface 13 via the regulator 12.

The regulator 12 is provided for regulating a level of an output voltage from the solar panel 11 at a constant.

The power source interface 13 is provided for connecting the battery pack 1 and the AC adapter 2 with each other. The power source interface 13 is connected to the charge/discharge circuit 15. The power source interface 13 supplies one of electrical energy supplied from the non-illustrated external power source via the AC adapter 2 and electrical energy supplied from the solar panel 11 via the regulator 12 to the charge/discharge circuit 15. Specifically, the power source interface 13 supplies the higher one of the electrical energy from the external power source and the electrical energy from the solar panel 11 to the charge/discharge circuit 15.

The discharge switch 14 is provided for discharging the chargeable battery 17, and manipulated by a user of the battery pack 1.

The charge/discharge circuit 15 charges the chargeable battery 17 by supplying electrical energy supplied from the power source interface 13 to the chargeable battery 17. At this time, the charge/discharge circuit 15 controls supplying of electrical energy so that the voltage to be applied to the chargeable battery 17 may be constant.

Further, the charge/discharge circuit 15 discharges electrical energy stored in the chargeable battery 17 to the outside, in a case where the discharge switch 14 is switched on. By this discharging, deterioration of the chargeable battery 17 can be prevented even through the battery pack 1 is not used for a long time.

The detailed structure of the charge/discharge circuit 15 will be described later.

The sensor 16 is constituted by a resistor circuit, and is provided for detecting a current flowing into the chargeable battery 17 and a current flowing out from the chargeable battery 17.

The chargeable battery 17 is constituted by a nickel-cadmium battery, a nickel-hydrogen battery, a lithium ion secondary battery, a lithium polymer secondary battery, or the like. The chargeable battery 17 stores electrical energy supplied from the charge/discharge circuit 15. The chargeable battery 17 supplies the stored electrical energy to the potable terminal device 3 via the device interface 18.

The device interface 18 is provided for connecting the battery pack 1 and the portable terminal device 3 with each other. The device interface 18 supplies electrical energy supplied from the external power source (not illustrated), the solar panel 11, and the chargeable battery 17 to the portable terminal device 3.

The display device 19 obtains the remaining amount of electrical energy stored in the chargeable battery 17, i.e., the remaining amount of electrical energy that can be supplied from the chargeable battery 17 based on a current detected by the sensor 16, and shows the obtained amount to the user. The detailed structure of the display device 19 will be described later.

Next, the detailed structures of the charge/discharge circuit 15, and display device 19 will be explained.

Figure 2:
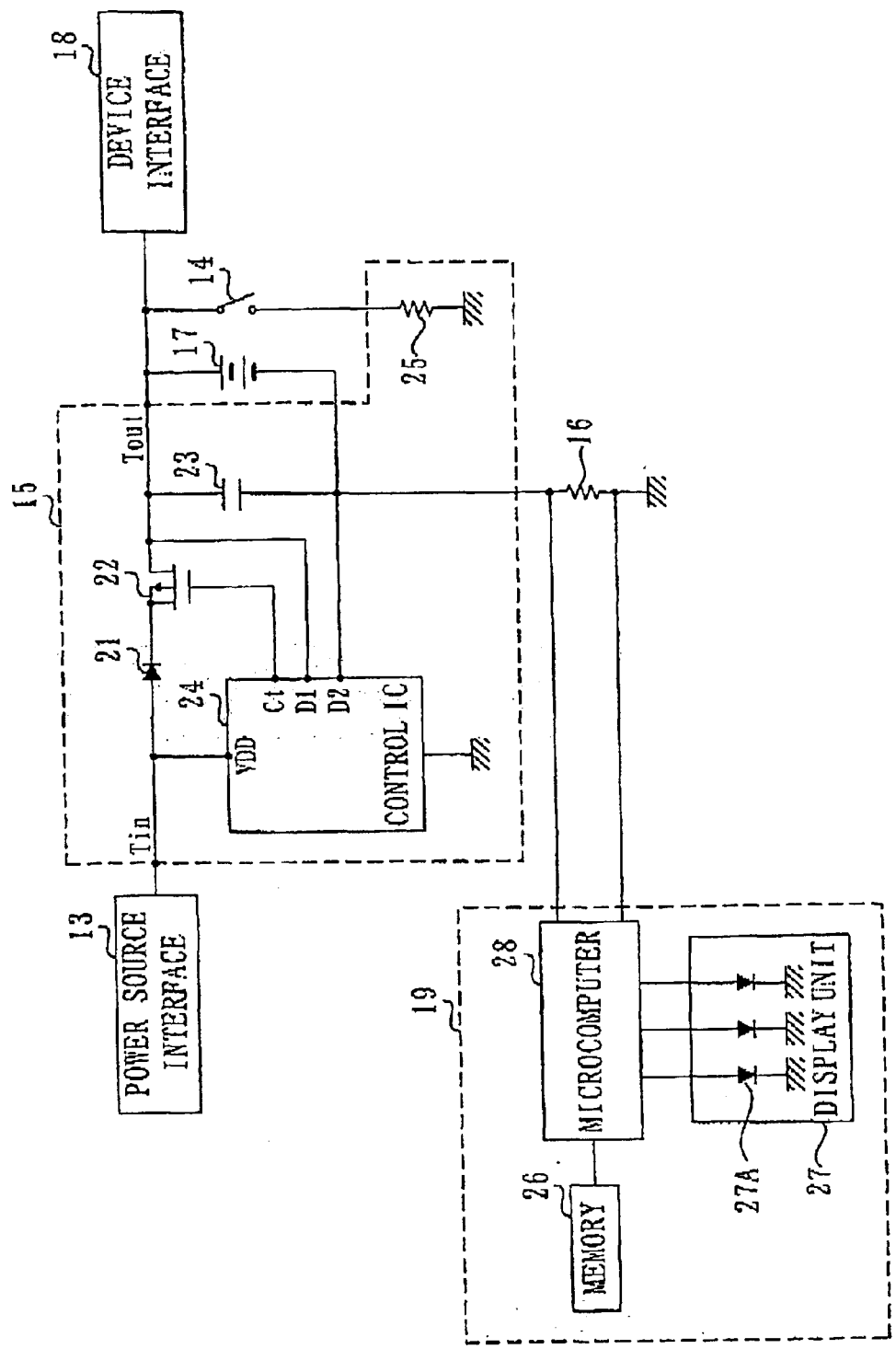
FIG. 2 is a diagram showing structures of a charge/discharge circuit and a display device included in the battery pack shown in FIG. 1.

As shown in FIG. 2, the charge/discharge circuit 15 comprises a diode 21, a MOSFET (Metal Oxide Semiconductor Field Effect Transistor) 22, a capacitor 23, a control IC (integrated Circuit) 24, and a discharge resistor 25.

The charge/discharge circuit 15 further comprises an input terminal Tin and an output terminal Tout. The input terminal Tin is connected to the power source interface 13. The output terminal Tout is connected to one end of the discharge switch 14, the anode of the chargeable battery 17, and the device interface 18.

The anode of the diode 21 is connected to the input terminal Tin, and the cathode thereof is connected to the output terminal Tout via the MOSFET 22. The diode 21 prevents a current from flowing backward from the chargeable battery 17 to the power source interface 13.

The MOSFET 22 is a P channel type transistor. The source of the MOSFET 22 is connected to the cathode of the diode 21, the drain thereof is connected to the output terminal Tout, and the gate thereof is connected to the control IC 24. The turning on and off of the MOSFET 22 is controlled by the control IC 24.

The capacitor 23 is connected to the chargeable battery 17 in parallel. Specifically, one end of the capacitor 23 is connected to the output terminal Tout (i.e., the anode of the chargeable battery 17), and the other end thereof is connected to the cathode of the chargeable battery 17. Due to this, fluctuation of a voltage to be applied to the chargeable battery 17 can be suppressed.

The control IC 24 monitors a voltage to be applied to the chargeable battery 17, when the chargeable battery 17 is charged, and keeps the voltage applied to the chargeable battery 17 constant by controlling the operation of the MOSFET 22.

Specifically, the control IC 24 comprises a power source terminal VDD, a voltage detection terminals D1 and D2, and a voltage control terminal Ct.

The power source terminal VDD is connected to the power source interface 13 via the input terminal Tin. The control IC 24 is activated by electrical energy supplied via the power source interface 13.

The voltage detection terminal D1 is connected to the output terminal Tout (i.e., the anode of the chargeable battery 17), and the voltage detection terminal D2 is connected to the cathode of the chargeable battery 17. The voltage control terminal Ct is connected to the gate of the MOSFET 22. The control IC 24 controls turning on and off of the MOSFET 22 by outputting a gate signal from the voltage control terminal Ct to the gate.

While the chargeable battery 17 is charged, the control IC 24 turns on and off the MOSFET 22 in such a duty ratio as that the potential difference between the voltage detection terminals D1 and D2, i.e., the voltage applied to the chargeable battery 17 would be kept constant.

One end of the discharge resistor 25 is connected to the other end of the discharge switch 14, and the other end thereof is grounded. When the discharge switch 14 is switched on, electrical energy stored in the chargeable battery 17 is discharged to the outside by the discharge resistor 25.

The displays device 19 comprises a memory 26, a display unit 27, and a microcomputer 28, as shown in FIG. 2.

The memory 26 stores remaining amount data which represents the remaining amount of electric energy stored in the chargeable battery 17.

The display unit 27 comprises a plurality of photodiodes 27A. Each photodiode 27A lights up in accordance with the control of the microcomputer 28.

The microcomputer 28 derives the remaining amount of electrical energy stored in the chargeable battery 17 and shows the derived remaining amount, in accordance with a program provided in advance.

Specifically, the microcomputer 28 detects potentials of both ends of the resistor circuit constituting the sensor 16. One end of the resistor circuit is connected to the cathode of the chargeable battery 17, and the other end thereof is grounded. Due to this, when the chargeable battery 17 is charged and discharged, a current flows through the resistor circuit, and a voltage is applied to the resistor circuit.

The resistance value of the resistor circuit is preset in the microcomputer 28. The microcomputer 28 derives the value of the current flowing through the resistor circuit based on the detected potentials and preset resistance value. Then, the microcomputer 28 adds up the derived current value.

A current flows in reversed directions when charging and discharging. In other words, the potential of the one end of the resistor circuit becomes positive when charging, and becomes negative when discharging. The microcomputer 28 adds up a positive current value when the potential of the one end of the resistor circuit is positive, and adds up a negative current value when the potential of the one end of the resistor circuit is negative, for example. As a result, the added-up value increases when charging, and the added-up value decreases when discharging.

The microcomputer 28 stores the added-up value obtained by adding up in the memory 26 as the remaining amount data representing the remaining amount of electrical energy, and updates the data when necessity arises. Further, the microcomputer 28 shows the user the remaining amount represented by the remaining amount data stored in the memory 26. Specifically, the microcomputer 28 controls the display unit 27 to light corresponding number of photodiodes 27A corresponding to the remaining amount. For example, lot it be assumed that there are three photodiodes 27A. In this case, if the remaining amount is equal to the capacity of the chargeable battery 17, the microcomputer 28 controls to light all of the three photodiodes 27A. If the remaining amount is two thirds of the capacity, the microcomputer 28 controls to light two of the three photodiodes 27A. Further, if the remaining amount is one third of the capacity, the microcomputer 28 controls to light one of the tree photodiodes 27A.

Next, how to assemble the battery pack 1 will be explained.

Figure 3A:
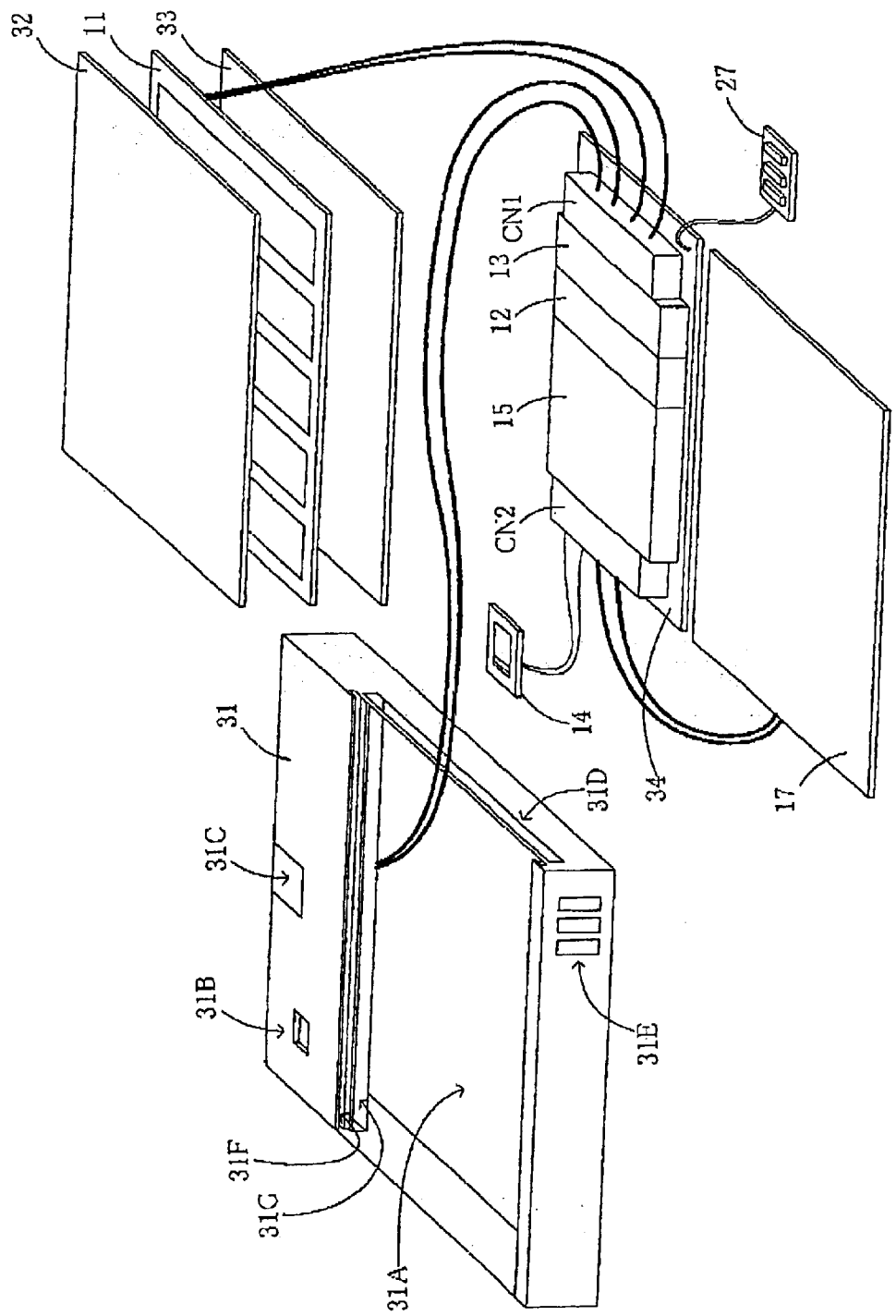
FIG. 3A is a diagram showing the battery pack before assembled.
Figure 3B:
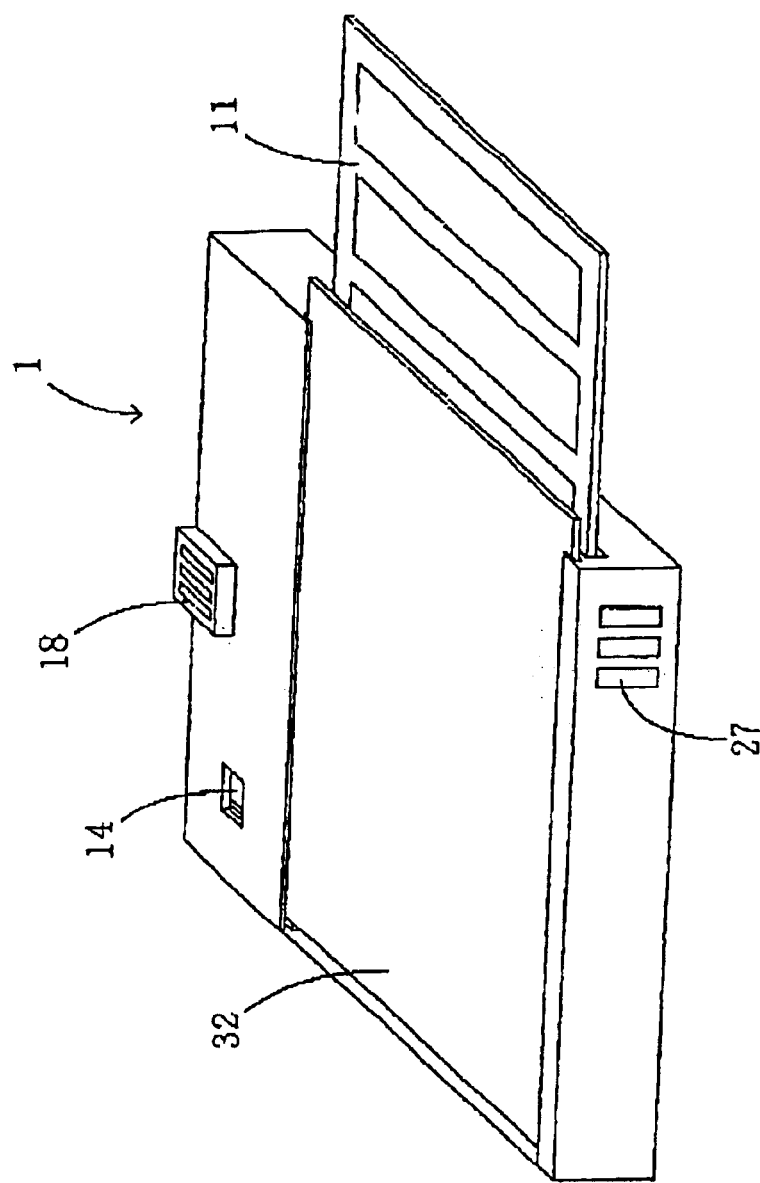
FIG. 3B is a diagram showing the battery pack after assembled.

FIG. 3A is a diagram showing a state of the battery pack 1 before assembled. FIG. 3B is a diagram showing a state of the battery pack 1 after assembled.

The body 31 of the battery pack 1 has a shape of a rectangular parallelepiped. Openings 31A, 31B, and 31C are formed on the upper surface of the body 31, and openings 31D and 31E are formed on the side surfaces of the body 31.

The solar panel 11 inserted from the opening 31D is set in the opening 31A. The discharge switch 14 is fit in the opening 31B, and the device interface 18 is fit in the opening 31C. The display unit 27 is fit in the opening 31E.

In the body 31, a pair of first grooves 31F and a pair of second grooves 31G are provided perpendicularly to the surface in which the opening 31D is formed and along the two sides of the opening 31A that are opposed to each other.

A transparent plate 32 is fit in the first grooves 31F. The solar panel 11 and a plate 33 are fit in the second grooves 31G. The plates 32 and 33 protect the solar panel 11 from an external shock.

The regulator 12, the power source interface 13, the charge/discharge circuit 15, the sensor 16, the microcomputer 28, and the memory 26 are mounted on a substrate 34. In FIG. 3A, the sensor 16, the microcomputer 28, and the memory 26 are not shown.

Further, a connector CN1 for connecting the solar panel 11 and the device interface 18 to the substrate 34, and a connector CN2 for connecting the discharge switch 14 and the chargeable battery 17 to the substrate 34 are mounted on the substrate 34.

The solar panel 11 and the device interface 18 are respectively connected to the connector CN1 through cables, and the discharge switch 14 and the chargeable battery 17 are respectively connected to the connector CN2 through cables. The cables are connected to the connectors CN1 and CN2 detachably.

The display unit 27 is connected directly to the substrate 34 by a wire.

When the battery pack 1 is to be assembled, firstly, the display unit 27 is fit in the opening 31E from the inside of the body 31.

Next the chargeable battery 17 is set at the bottom of the body 31 from the opening 31A.

Sequentially, the discharge switch 14 is fit in the opening 31B, and the device interface 18 is fit in the opening 31C.

In a case where the battery pack 1 is attached to the portable terminal device 3, the device interface 18 contacts an electrical contact point of the portable terminal device 3. Due to this, the battery pack 1 and the portable terminal device 3 are electrically connected.

After the discharge switch 14 and the device interface 18 are fit in the body 31, the substrate 34 is placed on the chargeable battery 17 front the opening 31A.

Then, the solar panel 11 and the plate 33 are inserted from the opening 31D and fit in the second grooves 31G.

Then, the plate 32 is fit in the first grooves 31F.

The solar panel 11 can slide along the second grooves 31G, and is attached to the body 31 detachably.

In the way described above, the battery pack 1 is assembled.

Next, the operation of the battery pack 1 will be explained.

(1) A Case where the AC Adapter 2 and the Portable Terminal Device 3 are not connected to the Battery Pack 1

The chargeable battery 17 is charged with electrical energy generated by the solar panel 11.

More specifically, when light is irradiated onto the solar panel 11, the solar panel 11 converts optical energy into electrical energy.

The electrical energy converted by the solar panel 11 is supplied to the charge/discharge circuit 15 through the regulator 12 and the power source interface 13. At this time, the regulator 12 regulates a level of an output voltage from the solar panel 11 at a constant.

The electrical energy from the solar panel 11 is supplied to the control IC 24 through the input terminal Tin. As a result, the control IC 24 is activated.

First, the control IC 24 supplies a gate signal to the gate of the MOSFET 22 from the voltage control terminal Ct, and turns on the MOSFET 22.

Due to this, the electrical energy from the solar panel 11 is supplied to the chargeable battery 17 and the capacitor 23 via the diode 21 and the MOSFET 22. In this case, since the portable terminal device 3 is not connected to the battery pack 1, the electrical energy is not supplied to the device interface 18.

While the chargeable battery 17 is charged with the electrical energy from the solar panel 11, the potential of the voltage detection terminal D2 is positive.

While the potential of the voltage detection terminal D2 is positive, the control IC 24 turns on and off the MOSFET 22 in such a duty ratio as that the potential difference between the voltage detection terminals D1 and D2 would be constant.

In this way, the chargeable battery 17 is charged with the electrical energy supplied from the solar panel 11.

Further, while the chargeable battery 17 is charged, a current also flows through the resistor circuit constituting the sensor 16.

The microcomputer 28 derives the remaining amount of the electrical energy stored in the chargeable battery 17 by adding up the value of the current flowing through the resistor circuit, and shows the derived remaining amount.

Figure 4:
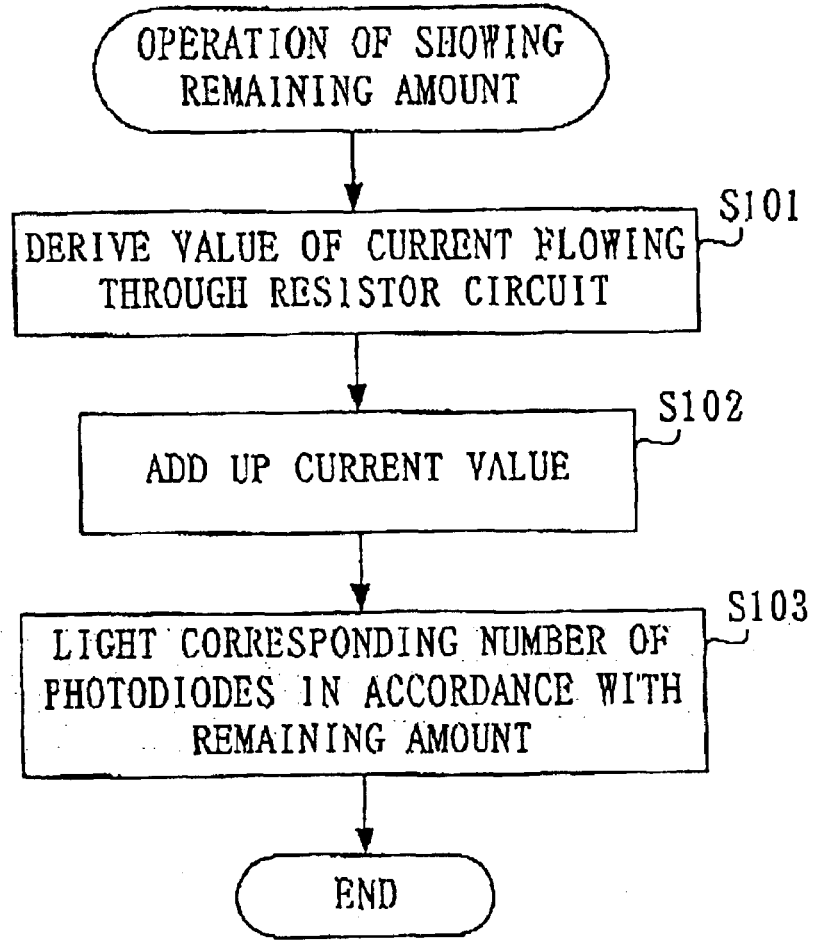
FIG. 4 is a flowchart showing an operation performed by a microcomputer included in the battery pack of FIG. 1, for showing remaining amount of electrical energy stored in a chargeable battery.

FIG. 4 is a flowchart showing the operation performed by the microcomputer 28 for showing the remaining amount.

The microcomputer 28 derives the value of the current flowing through the resistor circuit, based on the potentials of the both ends of the resistor circuit (step S101).

The microcomputer 28 adds up the derived current value (step S102). By this adding up, the microcomputer 28 derives the remaining amount or the electrical energy stored in the chargeable battery 17, that is, the remaining amount of electrical energy that can be supplied from the chargeable battery 17.

Then, the microcomputer 28 stores remaining amount data representing the remaining amount in the memory 26. And the microcomputer 28 controls the display unit 27 to light corresponding number of photodiodes 27A corresponding to the derived remaining amount (step S103).

The remaining amount of electrical energy that can be supplied from the chargeable battery 17 is shown to the user in the way described above.

(2) A Case where the AC Adapter 2 is not Connected to the Battery Pack 1, and the Portable Terminal Device 3 is Connected to the Battery Pack 1

In a case where the portable terminal device 3 does not operate, the operation of the battery pack 1 is substantially the same as the above described case (1).

On the other hand, in a case where the portable terminal device 3 operates, electrical energy for activating the portable terminal device 3 is supplied from one of the solar panel 11 and the chargeable battery 17 to the portable terminal device 3 via the device interface 18.

Specifically, in a case where electrical energy supplied by the solar panel 11 is lower than electrical energy supplied by the chargeable battery 17, the potential of the input terminal Tin is lower than the potential of the output terminal Tout. Therefore, a current does not flow from the input terminal Tin to the output terminal Tout, and thus electrical energy is not supplied to the portable terminal device 3 from the solar panel 11. Electrical energy stored in the chargeable battery 17 is supplied to the portable terminal device 3, and the portable terminal device 3 is activated by the electrical energy from the chargeable battery 17.

In a case where electrical energy is supplied to the portable terminal device 3 from the chargeable battery 17, the potential of the voltage detection terminal D2 becomes negative.

While the potential of the voltage detection terminal D2 is negative, the control IC 24 supplies a gate signal to the gate of the MOSFET 22 from the voltage control terminal Ct, and turns on the MOSFET 22.

When the electrical energy supplied by the chargeable battery 17 becomes lower than the electrical energy supplied by the solar panel 11, the potential of the input terminal Tin becomes higher than the potential of the output terminal Tout. Due to this, a current flows from the input terminal Tin to the output terminal Tout, and electrical energy is supplied to the portable terminal device 3 from the solar panel 11. Further, electrical energy from the solar panel 11 is also supplied to the chargeable battery 17, thereby the chargeable battery 17 is charged. In this way, electrical energy from the solar panel 11 is effectively utilized.

While the chargeable battery 17 is charged, the potential of the voltage detection terminal D2 is positive. While the potential of the voltage detection terminal D2 is positive, the control IC 24 controls turning on and off of the MOSFET 22 in a duty ratio in which a voltage to be applied to the chargeable battery 17 would be constant, likewise the above.

While the chargeable battery 17 is charged and discharged, a current flows through the resistor circuit constituting the sensor 16.

The microcomputer 28 performs the same operation as shown in FIG. 4. Specifically, the microcomputer 28 derives the remaining amount of electrical energy that can be supplied front the chargeable battery 17, and lights up corresponding number of photodiodes 27A corresponding to the derived remaining amount. As a result, the microcomputer 28 shows the remaining amount of electrical energy that can be supplied from the chargeable battery 17 to the user.

(3) A Case where the External Power Source is Connected to the Battery Pack 1 Via the AC Adapter 2, and the Portable Terminal Device 3 is not Connected to the Battery Pack 1.

The chargeable battery 17 is charged with electrical energy supplied from one of the external power source and the solar panel 11.

Specifically, in a case where electrical energy supplied by the solar panel 11 is higher than electrical energy supplied from the external power source, the power source interface 13 supplies electrical energy from the solar panel 11 to the charge/discharge circuit 15. Thus, the chargeable battery 17 is charged with electrical energy from the solar panel 11.

Like this, in a case where electrical energy from the solar panel 11 is higher than electrical energy from the external power source, the chargeable battery 17 is charged with electrical energy from the solar panel 11 regardless of whether the external power source is connected to the battery pack 1 or not.

On the other hand, electrical energy supplied by the solar panel 11 is lower than electrical energy supplied from the external power source, the power source interface 13 supplies electrical energy from the external power source to the charge/discharge circuit 15. Therefore, the chargeable battery 17 is charged with electrical energy from the external power source.

While the chargeable battery 17 is charged, the potential of the voltage detection terminal D2 is positive. While the potential of the voltage detection terminal D2 is positive, the control IC 24 controls turning on and off of the MOSFET 22 in a duty ratio in which a voltage to be applied to the chargeable battery 17 would be constant, likewise the above.

While the chargeable battery 17 is charged, a current also flows through the resistor circuit which constitutes the sensor 16.

The microcomputer 28 performs the same operation as shown in FIG. 4. Specifically, the microcomputer 28 derives the remaining amount of electrical energy that can be supplied from the chargeable battery 17, and lights up corresponding number of photodiodes 27A corresponding to the derived remaining amount. As a result, the microcomputer 28 shows the remaining amount of electrical energy that can be supplied from the chargeable battery 17 to the user.

(4) A Case where the External Power Source is Connected to the Battery Pack 1 Via the AC Adapter 2, and the Portable Terminal Device 3 is Connected to the Battery Pack 1

In a case where the portable terminal device 3 does not operate, the operation of the battery pack 1 is substantially the same as (3) described above.

On the other hand, in a case where the portable terminal device 3 operates, the highest one of electrical energy supplied from the external power source, electrical energy supplied by the solar panel 11, and electrical energy supplied by the chargeable battery 17 is supplied to the portable terminal device 3 via the device interface 18.

Specifically, in a case where the electrical energy supplied by the chargeable battery 17 is the highest, the potential of the input terminal Tin becomes lower than the potential of the output terminal Tout. Therefore, a current does not flow from the input terminal Tin to the output terminal Tout, and thus electrical energy is not supplied from the external power source or from the solar panel 11 to the portable terminal device 3. Electrical energy stored in the chargeable battery 17 is supplied to the portable terminal device 3, and the portable terminal device 3 is activated by the electrical energy from the chargeable battery 17.

In a case where electrical energy supplied by the solar panel 11 is the highest, the power source interface 13 supplies electrical energy from the solar panel 11 to the charge/discharge circuit 15. And the potential or the input terminal Tin becomes higher than the potential of the output terminal Tout.

Therefore, a current flows from the input terminal Tin to the output terminal Tout, and electrical energy is supplied from the solar panel 11 to the portable terminal device 3. Further, the electrical energy from the solar panel 11 is also supplied to the chargeable batted 17, thereby the chargeable battery 17 is charged.

In a case where electrical energy supplied from the external power source is the highest, the power source interface 13 supplies electrical energy from the external power source to the charge/discharge circuit 15. And, the potential of the input terminal Tin becomes higher than the potential of the output terminal Tout.

Thus, a current flows from the input terminal Tin to the output terminal Tout, and electrical energy is supplied from the external power source to the portable terminal device 3. Further, electrical energy from the external power source is also supplied to the chargeable battery 17. Thus, the chargeable battery 17 is charged.

While the chargeable battery 17 is charged, the potential of the voltage detection terminal D2 is positive. While the voltage detection terminal D2 is positive, the control IC 24 controls turning on and off of the MOSFET 22 in a duty ratio in which a voltage to be applied to the chargeable battery 17 would be constant, likewise the above.

Further, while the chargeable battery 17 is charged and discharged, a current also flows through the resistor circuit which constitutes the sensor 16.

The microcomputer 28 performs the same operation as shown in FIG. 4. Specifically, the microcomputer 28 derives the remaining amount of electrical energy that can be supplied from the chargeable battery 17, and lights corresponding number of photodiodes 27A corresponding to the derived remaining amount. As a result, the microcomputer 28 shows the remaining amount of electrical energy that can be supplied from the chargeable battery 17 to the user.

(5) A Case where the Battery Pack 1 is Stored Away for a Long Time

The user of the battery pack 1 should detach the battery pack 1 from the AC adapter 2 and the portable terminal device 3, and then switch on the discharge switch 14.

When the discharge switch 14 is switched on, a current flows from the chargeable battery 17 to the discharge resistor 25. Due to this, electrical energy stored in the chargeable battery 17 is discharged to the outside by the discharge resistor 25.

By discharging the chargeable battery 17 in the way described above, deterioration of the chargeable battery 17 can be prevented even if the battery pack 1 is not to be used for a long time.

As described so far, the microcomputer 28 of the battery pack 1 derives the remaining amount of electrical energy that can be supplied from the chargeable battery 17, and lights up corresponding number of photodiodes 27A corresponding to the derived remaining amount. Due to this, the user of the battery pack 1 can easily confirm the remaining amount of the chargeable battery 17.

Second Embodiment

Next, a battery pack according to a second embodiment of the present invention will be explained with reference to the drawings.

Figure 5:
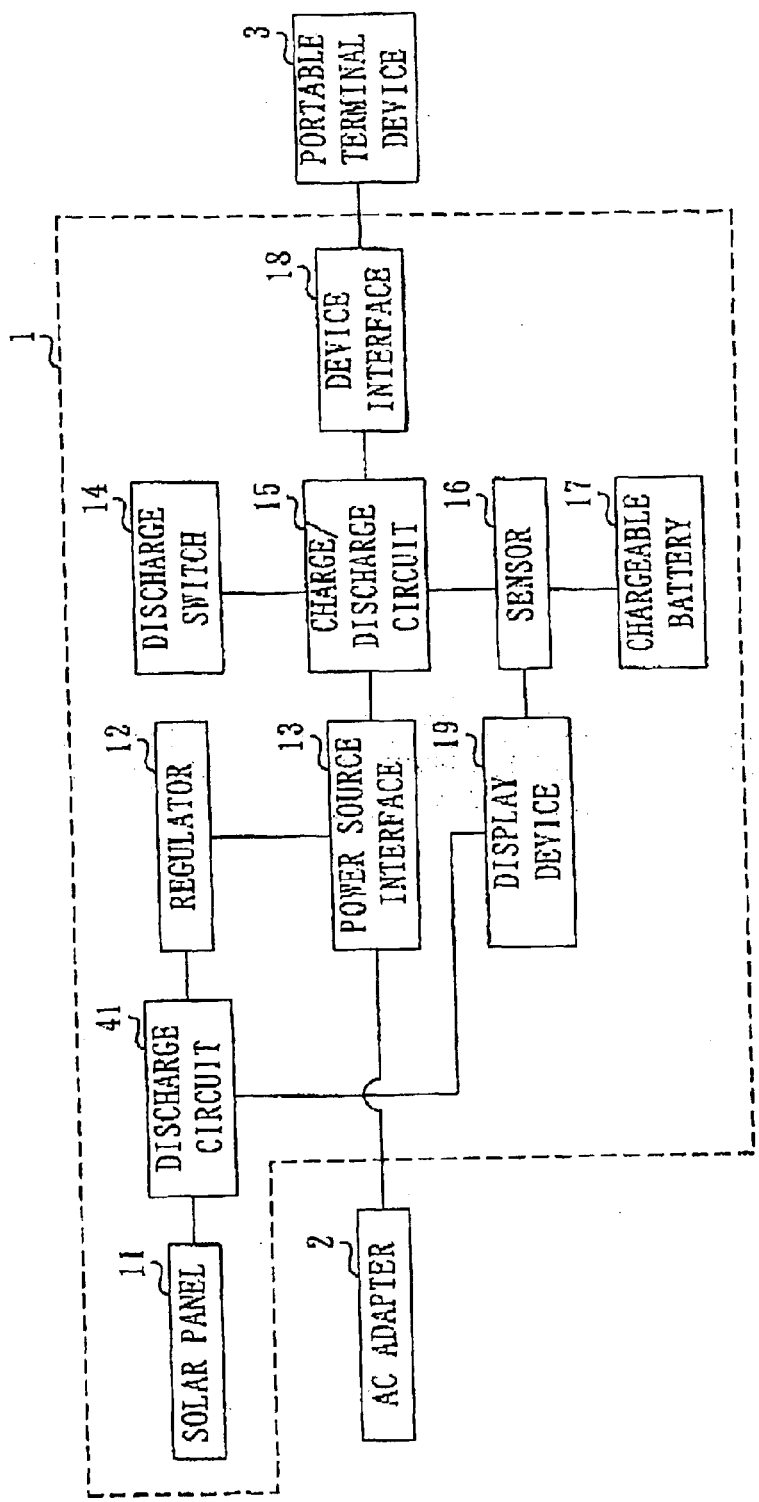
FIG. 5 is a diagram showing a structural of a battery pack according to a second embodiment.
Figure 6:
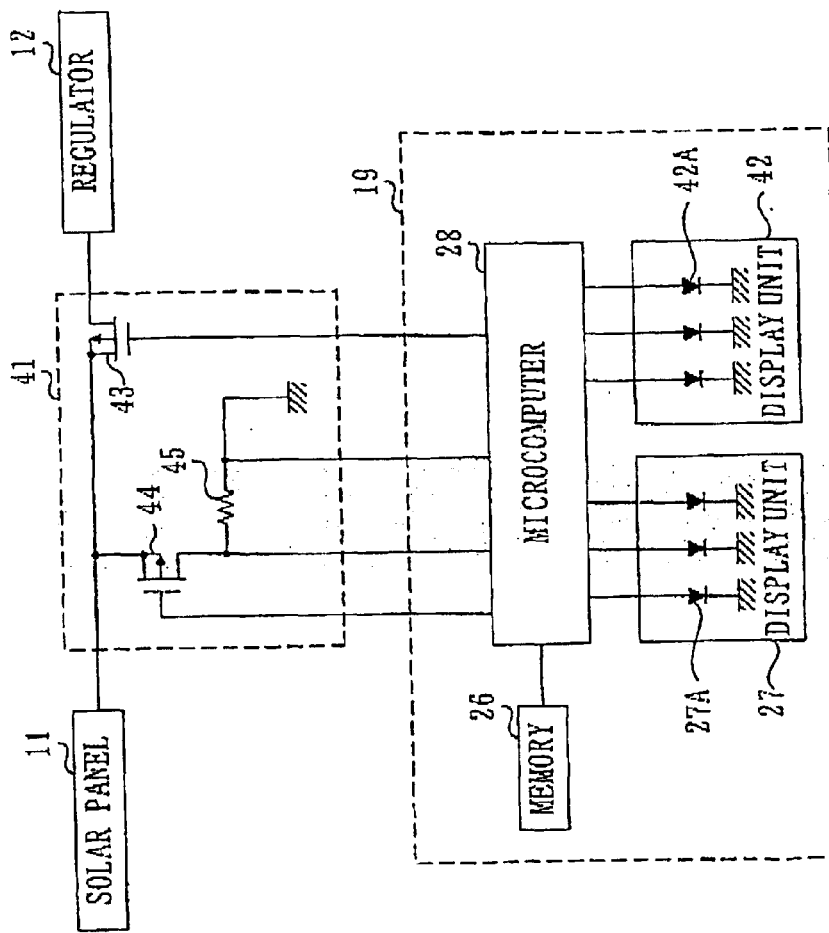
FIG. 6 is a diagram showing, structures of a discharge circuit and a display device included in the battery pack shown in FIG. 5.

As shown in FIG. 5 and FIG. 6, the battery pack 1 according to the second embodiment comprises a discharge circuit 41 and a display unit 42, in addition to the components of the battery pack 1 explained in the first embodiment.

The discharge circuit 41 is connected between the solar panel 11 and the regulator 12. The discharge circuit 41 is provided for detecting the level of electrical energy supplied by the solar panel 11.

As shown in FIG. 6, the discharge circuit 41 comprises a MOSFETs 43 and 44, and a resistor 45.

The MOSFETs 43 and 44 are P channel type transistors.

The source of the MOSFET 43 is connected to the solar panel 11, the drain thereof is connected to the regulator 12, and the gate thereof is connected to the microcomputer 28. Turning on and off of the MOSFET 43 is controlled by the microcomputer 28.

The source of the MOSFET 44 is connected to the solar panel 11, and the drain and gate thereof are connected to the microcomputer 28. Turning on and off of the MOSFET 44 is controlled by the microcomputer 28.

One end of the resistor 45 is connected to the drain of the MOSFET 44 and the microcomputer 28, and tho other end thereof is grounded and also connected to the microcomputer 28. The resistance value of the resistor 45 is preset in the microcomputer 28.

The display unit 42 is provided in the display device 19. The display unit 42 comprises a plurality of photodiodes 42A. Each photodiode 42A lights up in accordance with the control of the microcomputer 28.

The microcomputer 28 derives the level of electrical energy supplied by the solar panel 11, and shows the level of the electrical energy supplied by the Solar panel 11 to the user by lighting corresponding number of photodiodes 42A corresponding to the derived level, under the control of a program provided in advance. For example, let it be assumed that there are three photodiodes 42A. In this case, if die derived level is equal to the maximum level that can be supplied by the solar panel 11, the microcomputer 28 lights all of the three photodiodes 42A. If the derived level is two thirds of the maximum level, the microcomputer 28 lights two of the photodiodes 42A. Further, if the derived level is one third of the maximum level, the microcomputer 28 lights one of the photodiodes 42A.

Components other than the above described are substantially the same as those shown in the first embodiment.

Figure 7:
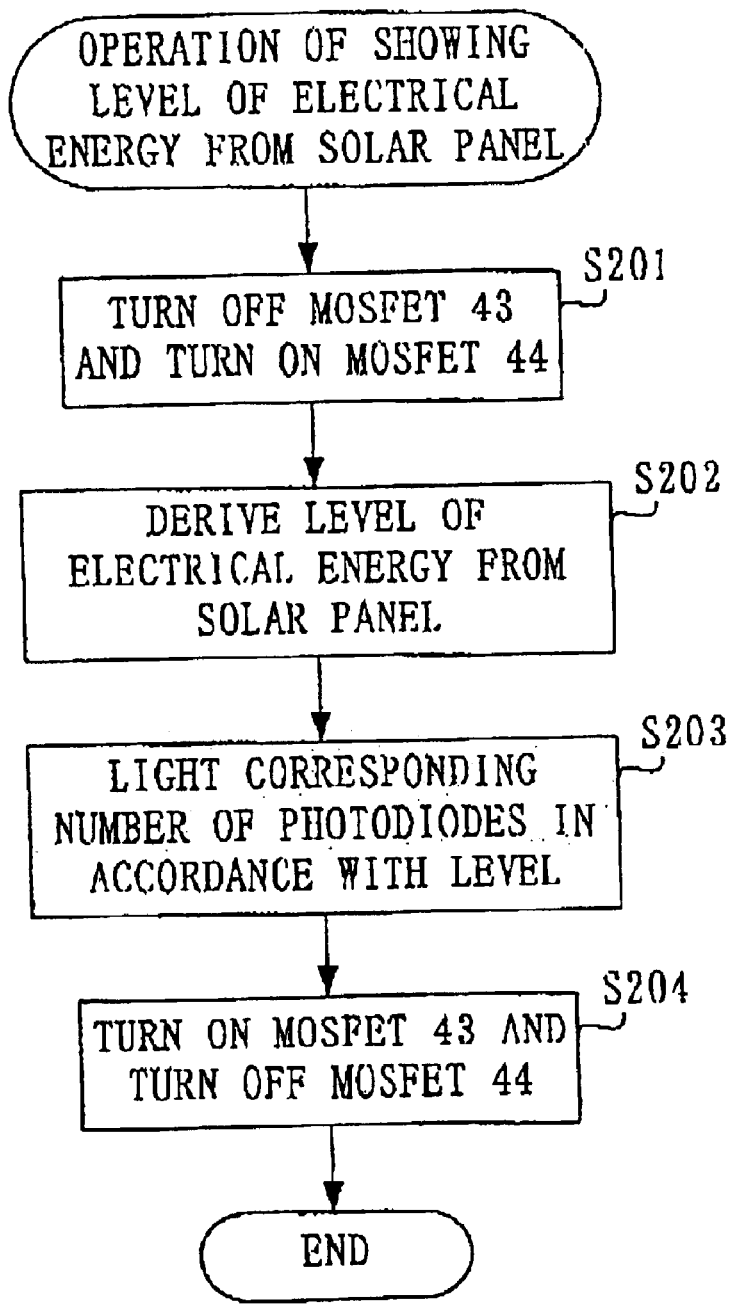
FIG. 7 is a flowchart showing an operation performed by a microcomputer included in the battery pack shown in FIG. 5, for showing level of electrical energy supplied by a solar panel.

Next, an operation of the microcomputer 28 when showing the level of electrical energy supplied by the solar panel 11 will be explained with reference to a flowchart shown in FIG. 7.

First, the microcomputer 28 turns off the MOSFET 43, and turns on the MOSFET 44 (step S201). As a result, a current flows from the solar panel 11 through the resistor 45, via the MOSFET 44.

The microcomputer 28 derives the level of the current flowing through the resistor 45, based on the preset resistance value of the resistor 45 and the potentials of the both ends of the resistor 45. By doing so, the microcomputer 28 derives the level of the electrical energy supplied by the solar panel 11 (step S202).

Then, the microcomputer 28 controls the display unit 42 to light up corresponding number of photodiodes 42A corresponding to the derived level of the current (i.e., the level of electrical energy to be supplied) (step S203). Thus, the level of electrical energy supplied by the solar panel 11 is shown to the user.

After this, the microcomputer 28 turns off the MOSFET 44, and turns on the MOSFET 43 (step S204). In response to this, the electrical energy from the solar panel 11 is supplied to the regulator 12 via the MOSFET 43.

The microcomputer 28 repeats the above operation at preset time intervals.

As described above, the microcomputer 28 lights up corresponding number of photodiodes 42A corresponding to the level of the electrical energy supplied by the solar panel 11. Due to this, the user of the battery pack 1 can easily confirm the level of the electrical energy supplied by the solar panel 11.

Modification

In the first and second embodiments, the battery pack 1 may indicate which of the external power source, the solar panel 11, and the chargeable battery 17 is the supply source of electrical energy.

Figure 8:
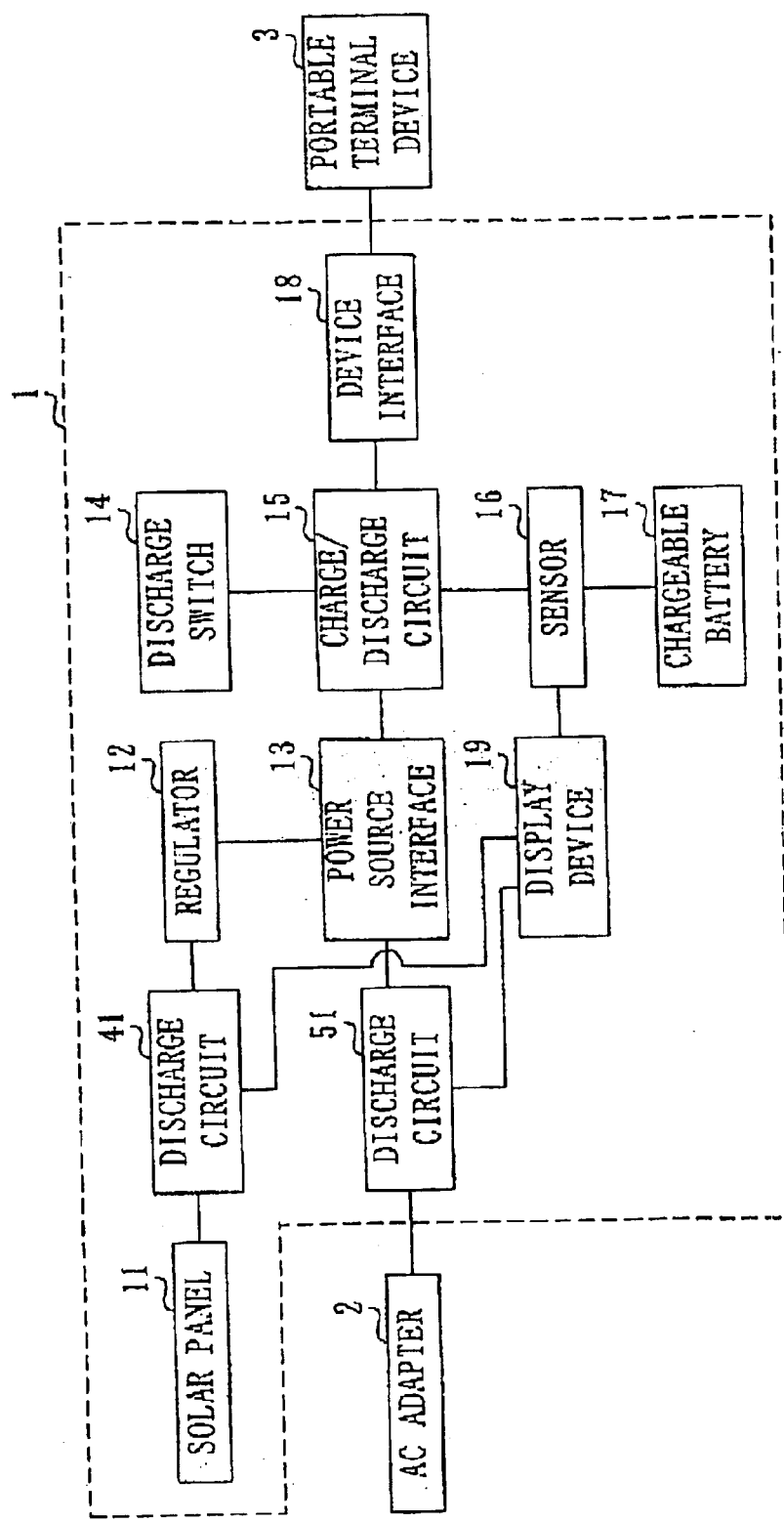
FIG. 8 is a diagram showing another structure of the battery pack according to the first and second embodiments.
Figure 9:
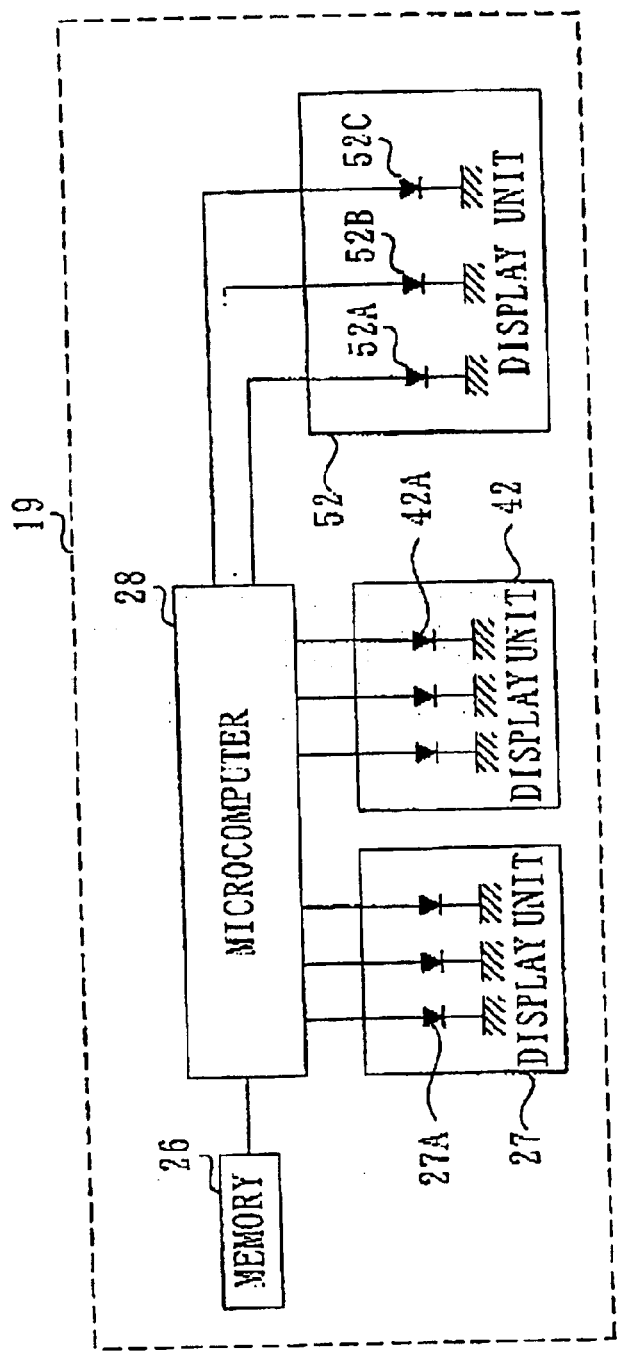
FIG. 9 is a diagram showing a structure of a display device included in the battery pack shown in FIG. 8.

In this case, as shown in FIG. 8 and FIG. 9, the battery pack 1 further comprises a discharge circuit 51 and a display unit 52, in addition to the components shown in the second embodiment.

The discharge circuit 51 has substantially the same structure as that of the discharge circuit 41, and is connected between the AC adapter 2 and the power source interface 13. The discharge circuit 51 is provided for detecting the level of electrical energy supplied from the external power source.

The display unit 52 comprises three photodiodes 52A, 52B, and 52C, as shown in FIG. 9.

The photodiode 52A indicates that the supply source of electrical energy is the chargeable battery 17. The photodiode 52B indicates that the supply source of electrical energy is the solar panel 11. The photodiode 52C indicates that the supply source of electrical energy is the external power source.

The photodiodes 52A, 52B, and 52C light up under the control of the microcomputer 28.

Figure 10:
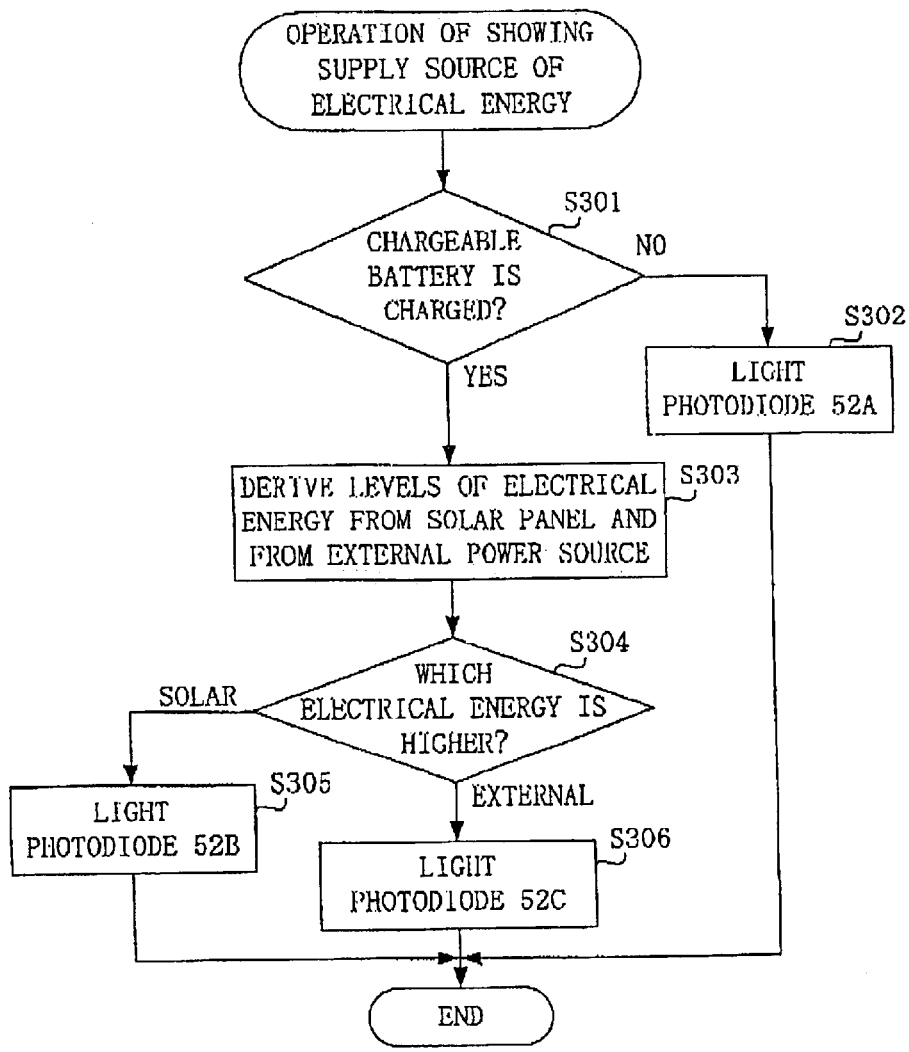
FIG. 10 is a flowchart showing an operation performed by a microcomputer included in the battery pack shown in FIG. 8, for indicating supply source of electrical energy.

As shown in FIG. 10, first, the microcomputer 28 determines whether or not the chargeable battery 17 is charged, based on the potential of the one end of the resistor circuit constituting the sensor 16 (step S301).

In a case where the potential of the none end of the resistor circuit is negative, the microcomputer 28 determines that the chargeable battery 17 is discharged (step S301; NO). In this case, the microcomputer 28 specifies the chargeable battery 17 as the supply source of electrical energy. Then, the microcomputer 28 shows that the supply source is the chargeable battery 17, by lighting the photodiode 52A (step S302).

On the other hand, in a case where the potential of the one end of the resistor circuit is positive, the microcomputer 28 determines that the chargeable battery 17 is charged (step S301; YES). In this case, the microcomputer 28 derives the level of electrical energy supplied from the solar panel 11, and the level of electrical energy supplied from the external power source, in the same way as described in the second embodiment (step S303).

Then, the microcomputer 28 determines which of the electrical energy from the solar panel 11 and the electrical energy from the external power source is higher than the other (step S304).

In a case where determining that the electrical energy from the solar panel 11 is higher than the electrical energy from the external power source (step S304; Solar), the microcomputer 28 specifics the solar panel 11 as the supply source of electrical energy. Then, the microcomputer 28 shows that the supply source is the solar panel 11 by lighting the photodiode 52B (step S305).

On the other hand, in a case where determining that the electrical energy from the solar panel 11 is lower than the electrical energy form the external power source (step S304; External), the microcomputer 28 specifics the external power source as the supply source of electrical energy. Then, the microcomputer 28 shows that the supply source is the external power source, by lighting the photodiode 52C (step S306).

By this operation, the user can easily distinguish the supply source which supplies electrical energy for activating the portable terminal device 3. Further, in a case where the portable terminal device 3 is not connected to the battery pack 1, the user can easily distinguish which of the external power source and the solar panel 11 supplies electrical energy for charging the chargeable battery 17.

The MOSFETs 22, 43, and 44 shown in the first and second embodiments may be N channel type transistors. Further, bipolar transistors may be used instead of the MOSFETs 22, 43, and 44. That is, any type of switching element may be used as long as it can control supplying of electrical energy (or a current).

Further, in the first and second embodiments, the regulator 12 may have a function of setting the level of an output voltage from the solar panel 11 at a predetermined level. With this function, supply sources of electrical energy can be restricted. For example, by setting the output voltage from the solar panel 11 smaller than the voltage of the external power source, the chargeable battery 17 is always charged with electrical energy from the external power source without exceptions, in a case where the external power source is connected to the battery pack 1.

Furthermore, the aforementioned display units 27, 42, and 52 may be constituted by other components than photodiodes, as long as such components can indicate the remaining amount of electrical energy, etc. For example, the display units 27, 42, and 52 may be constituted by light emitting diodes, electroluminescence elements, liquid crystal display panels, or the like.

Still further, the present invention can be applied not only to the aforementioned battery pack 1 comprising the chargeable battery 17, but also to a battery pack comprising a dry cell. In case of a dry cell, the remaining amount of electrical energy that can be supplied from the dry cell is shown in the same way as explained above.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-017862 filed on Jan. 28, 2002 and including specification, claims, drawings and summary. The disclosure of the above Japanese Patent Application is incorporated herein by reference in its entirety.

What is claimed is:

1. A battery pack comprising:

a chargeable battery which provides electrical energy;

a resistor circuit connected to said battery;

a connection to an external power source that provides electrical energy;

a solar panel that converts light energy into electrical energy;

a power source interface connected to said solar panel and to said connection to an external power source, said power source interface providing electrical power from one of said solar panel and said connection to an external power source to said battery to charge said battery;

a microcomputer which derives a remaining amount of electrical energy available from said battery by adding current flowing through said resistor circuit; and a first display which shows the remaining amount derived by said microcomputer.

2. The battery pack according to claim 1, wherein said first display includes a plurality of light emitting elements, and wherein a number of said light emitting elements illuminated corresponds to the remaining amount derived by said microcomputer.

3. The battery pack according to claim 1, wherein said microcomputer derives a first level of electrical energy supplied from said solar panel, and further comprising a second display which shows the first level derived by said microcomputer.

4. The battery pack according to claim 3, wherein said second display includes a plurality of light emitting elements, and wherein a number of said light emitting elements illuminated corresponds to the first level.

5. The battery pack according to claim 1, wherein said battery pack is connectable to an external device, and when connected to said external device, supplies electrical energy from one of said battery, said solar panel, and said connection to an external power source to said external device; and wherein when electrical energy is supplied from one of said solar panel and said connection to an external power source to said external device, said battery is charged with electrical energy from the one of said solar panel and said connection to an external power source.

6. The battery pack according to claim 5, wherein said microcomputer specifies which of said battery, said solar panel, and said connection to an external power source is a supply source of electrical energy which is supplied to said external device; and further comprising a third display which shows the supply source specified by said microcomputer.

7. The battery pack according to claim 6, wherein said microcomputer determines whether said battery is charged or not, and in a case where determining that said battery is not charged, specifies said battery as the supply source.

8. The battery pack according to claim 7, wherein said microcomputer derives a first level of electrical energy supplied from said solar panel and derives a second level of electrical energy supplied from said connection to an external power source, wherein said microcomputer determines which of said first level and said second level is higher than the other in a case where it determines that said battery is charged, specifies said solar panel as the supply source in a case where it determines that said first level is higher, and specifies said connection to an external power source as the supply source in a case where it determines that said second level is higher.

9. The battery pack according to claim 8, wherein:

said third display includes a first light emitting element which indicates that the supply source is said battery, a second light emitting element which indicates that the supply source is said solar panel, and a third light emitting element which indicates that the supply source is said connection to an external power source, and said microcomputer lights up said first light emitting element in a case where it specifies said battery as the supply source, lights up said second light emitting element in a case where it specifies said solar panel as the supply source, and lights up said third light emitting element in a case where it specifies said connection to an external power source as the supply source.

10. A battery pack comprising:

a chargeable battery which provides electrical energy;

a solar panel that converts light energy into electrical energy;

a connection to an external source of electrical energy;

an interface that connects said battery to a one of said solar panel and said connection that provides a greater amount of electrical energy, to charge said battery;

a microcomputer which derives a remaining amount of electrical energy available from said battery by adding current flow to and from said battery; and a first display which shows the remaining amount derived by said microcomputer.

11. The battery pack according to claim 10, wherein said microcomputer determines a level of electrical energy supplied by said solar panel, and further comprising a plurality of light emitting elements, wherein a number of said light emitting elements illuminated corresponds to said level.

* * * * *